United States Patent

Yale et al.

[11] 3,714,201
[45] Jan. 30, 1973

[54] 5,11-DIHYDRODIBENZOXA(OR THIA) ZEPINE DERIVATIVES

[75] Inventors: Harry Louis Yale; Ramesh B. Petigara, both of New Brunswick, N.J.

[73] Assignee: E. R. Squibb & Sons, Inc., New York, N.Y.

[22] Filed: Nov. 24, 1970

[21] Appl. No.: 92,498

[52] U.S. Cl. ............... 260/333, 252/106, 252/175, 260/243 B, 260/247.1, 260/247.2 B, 260/268 TR, 260/293.57, 260/293.58, 260/326.3, 260/327 B, 424/246, 424/248, 424/250, 424/263, 424/267, 424/274, 424/275, 424/278

[51] Int. Cl. .... A61k 27/00, C07d 87/54, C07d 93/42

[58] Field of Search....260/327 B, 333, 243 B, 247.1, 260/247.2 B, 268 TC, 293.57, 293.58, 326.3

[56] References Cited

OTHER PUBLICATIONS

Morrison, et al., "Organic Chemistry" (Allyn and Bacon, Inc., Boston, 1959), pages 445 and 474.

*Primary Examiner*—Henry R. Jiles
*Assistant Examiner*—Cecilia M. S. Jaisle
*Attorney*—Lawrence S. Levinson, Merle J. Smith, Donald J. Perrella and Burton Rodney

[57] ABSTRACT

5,11-Dihydrodibenzoxa(or thia)zepine derivatives are provided having the structure

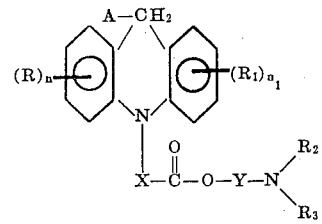

wherein A is O, S, SO or $SO_2$ and R, $R_1$, $R_2$, $R_3$, X, Y, $n$ and $n_1$ are as defined hereinafter. These compounds are useful in lowering blood-pressure and as anti-inflammatory agents.

5 Claims, No Drawings

5,11-DIHYDRODIBENZOXA(OR THIA)ZEPINE DERIVATIVES

The present invention relates to 5,11-dihydrodibenzoxa-(or thia)zepine derivatives of the structure

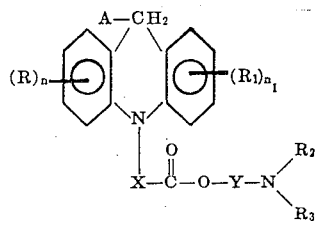

wherein R and $R_1$ are the same or different and can be halogen, trifluoromethyl, lower alkyl, cycloalkyl, lower alkylmercapto, lower alkyloxy, cyano or di-lower alkylsulfamoyl, $n$ is 0, 1 or 2 and $n_1$ is 0, 1 or 2, X is an alkylene radical containing from one to about six carbon atoms, Y is an alkylene radical containing from one to about four carbon atoms, $R_2$ and $R_3$ may be the same or different, representing hydrogen, lower alkyl, monocyclic cycloalkyl, monocyclic cycloalkyl-lower alkyl, hydroxy-lower alkyl, monocyclic aryl, monocyclic aryl-lower alkyl, or monocyclic heterocyclic alkyl.

The

group may also form a heterocyclic radical.

X and Y represent straight or branched chain bivalent aliphatic hydrocarbon groups having from one to about six carbon atoms in the linking chain in the case of X and from one to about four carbon atoms in the linking chain in the case of Y, such as methylene, ethylene, propylene, butylene, dimethylethylene, 1-propylbutylene, 1,2-diisopropylpentylene, 1-ethyl-2-butylhexylene and the like. Furthermore, X and Y as bivalent groups can correspond to any of the lower alkyl groups exemplified hereinafter with the carbon limitations noted above.

The term "lower alkyl" as employed herein includes both straight and branched chain radicals of up to eight carbon atoms, for instance, methyl, ethyl, propyl, isopropyl, butyl, t-butyl, isobutyl, pentyl, hexyl, isohexyl, heptyl, 4,4-dimethylpentyl, octyl, 2,2,4-trimethylpentyl, and the like.

The term "halogen" includes F, Br, Cl or I.

The term "lower alkoxy" includes straight and branched chain radicals which correspond to the above lower alkyl groups attached to an oxygen atom.

The lower alkylmercapto groups contain up to eight carbon atoms and include methylmercapto, ethylmercapto, propylmercapto and mercapto radicals containing any of the lower alkyl groups mentioned hereinbefore.

The term "monocyclic aryl" as employed herein contemplates monocyclic carbocyclic aryl radicals, for instance, phenyl and substituted phenyl radicals, such as lower alkyl-phenyl (e.g., o-, m- or p-tolyl, ethylphenyl, butylphenyl, and the like), di(lower alkyl)phenyl (e.g., 2,4-dimethylphenyl, 3,5-diethylphenyl, and the like), halophenyl (e.g., chlorophenyl, bromophenyl, iodophenyl, fluorophenyl), o-, m- or p-nitrophenyl, dinitrophenyl, (e.g., 3,5-dinitrophenyl, 2,6-dinitrophenyl, and the like) trinitrophenyl (e.g., picryl).

The term "monocyclic cycloalkyl" includes cyclic radicals containing from 3 to 6 ring members (e.g., cyclopropyl, cyclobutyl, cyclopentyl, and cyclohexyl).

As indicated hereinbefore,

may form a heterocyclic radical. The symbols $R_2$ and $R_3$ may together represent the carbon (and hydrogen) and the oxygen, sulfur or nitrogen atoms which, with the nitrogen atom in the above group, form a 5-, 6-, 7-membered nitrogen heterocyclic containing not more than one hetero atom in addition to the nitrogen already shown in the group and less than 21 atoms in the radical (excluding hydrogen). The heterocyclic radicals may include one to three substituents including lower alkoxy, lower alkyl or aryl as defined hereinafter; trihalomethoxy, such as trifluoromethoxy; trihalomethylmercapto, such as trifluoromethylmercapto; N,N,-dialkylsulfamoyl groups, such as N,N-dimethylsulfamoyl; lower alkanoyl groups as defined hereinafter such as acetyl, propionyl, and the like; hydroxy; hydroxy-lower alkyl, such as hydroxymethyl, 2-hydroxyethyl, or the like; hydroxy-lower alkoxy-lower alkyl, such as 2-(2-hydroxyethoxy)ethyl, or the like; alkanoyloxy containing an alkanoyl as defined herein; alkanoyloxy-lower alkyl (up to about 14 carbons in the alkanoyl group), such as 2-heptanoyloxyethyl; carbo-lower alkoxy, such as carbomethoxy, carboethoxy, carbopropoxy, or the like; or 2-(alkanoyloxy-lower alkoxy) lower alkyl (with up to about 14 carbons in the alkanoyl group), such as 2-(decanoyloxyethoxy)-ethyl, heterocyclic radicals such as defined herein as well as pyridyl and benzimidazolyl.

Illustrative of the heterocyclic radicals represented by

are the following: piperidino; (lower alkyl)-piperidino [e.g., 2-, 3-, or 4-(lower alkyl)piperidino such as 2-(ethyl)piperidino, or 4-(isopropyl)-piperidino]; di(lower alkyl)piperidino [e.g., 2,4-, 2,5- or 3,5-di(lower alkyl)-piperidino such as 2,4-dimethyl piperidino or 2,5-di-t-butyl-piperidino]; (lower alkoxy)piperidino [e.g., 2-methoxypiperidino or 3-methoxypiperidino]; hydroxypiperidino [e.g., 3-hydroxy- or 4-hydroxypiperidino]; aminomethylpiperidino [e.g., 4-aminomethylpiperidino]; 4-[1-(2-oxobenzimidazolyl)]piperidino 4,4-disubstituted piperidino like 4-hydroxy-4-phenylpiperidino, or 4-hydroxy-4-p-chloro or p-methoxy or M-(trifluoromethyl)phenyl piperidino, 4-carbamyl-4-piperidyl piperidino, pyrrolidino; (lower alkyl)-pyrrolidino [e.g., 3-methyl-pyrrolidino]; di(lower alkyl)-pyrrolidino [e.g., 3,4-dimethyl-pyrrolidino]; (lower alkoxy)-pyrrolidino [e.g., 2-methoxy-pyrrolidino];

morpholino; (lower alkyl)morpholino [e.g., 3-methylmorpholino]; di(lower alkyl)morpholino [e.g., 3,5-dimethylmorpholino]; (lower alkoxy)morpholino [e.g., 2-methoxymorpholino]f8; thiamorpholino; (lower alkyl)thiamorpholino [e.g., 3-methylthiamorpholino]; di(lower alkyl)thiamorpholino [e.g., 3,5-dimethylthiamorpholino]; (lower alkoxy)thiamorpholino [e.g., 3-methoxythiamorpholino]; piperazino; N⁴-aryl piperazino, e.g. [e.g., o-anisyl, p-chlorophenyl, m-tolyl] (lower alkyl)piperazino [e.g., N⁴-methylpiperazino]; di(lower alkyl)- piperizino [e.g., 2,5-dimethylpiperazino or 2,6-dimethylpiperazino]; (lower alkoxy)-piperazino [e.g., 2-methoxypiperazino]; (hydroxy-lower alkyl)-piperazino [e.g., N⁴-(2-hydroxyethyl)piperazino]; (alkanoyloxy-lower alkyl)piperazino wherein the alkanoyloxy group has up to 14 carbons [e.g., N⁴-(2-heptanoyloxyethyl)piperazino or N⁴-(2-dodecanoyloxyethyl)piperazino]; (hydroxy-lower alkoxy-lower alkyl)piperazino [e.g., (hydroxy-methoxy-methyl)-piperazino]; (carbo-lower alkoxy)piperazino [e.g., N⁴-(carbomethoxy-, carboethoxy-, or carbopropoxy)piperazino]; N⁴-heterocyclic-piperazino[e.g., N⁴-(pyridyl)piperazino]; homopiperazino; or N⁴-(hydroxy-lower alkyl)homopiperazino [e.g., N⁴-(2-hydroxyethyl)homopiperazino].

The N-oxides of the compounds of Formula I where

represents a nitrogen containing heterocyclic radical can be formed by reacting such Formula I compounds with a peracid such as m-chloroperbenzoic acid, perbenzoic acid or monoperphthalic acid in a suitable solvent such as chloroform.

The compounds of Formula I form acid addition salts by reaction with various inorganic and organic acids. These salts frequently provide convenient means for separating the product from the reaction mixture in which it is produced or from the solvent in which it is extracted in view of their insolubility in various media. Thus the product may be precipitated in the form of an insoluble salt and converted, by conventional techniques, to the free base or to another soluble or insoluble salt as desired.

Illustrative salts include the hydrohalides, such as hydrochloride, hydrobromide and hydroiodide, especially the first two, other mineral acid salts such as phosphate, sulfate, nitrate, etc., organic acid salts such as oxalate, tartrate, malate, maleate, citrate, pamoate, fumarate, camphorsulfonate, methanesulfonate, benzenesulfonate, toluenesulfonate, salicylate, benzoate, ascorbate, mandelate, or the like.

The compounds of Formula I also form quaternary ammonium salts with lower alkyl halides, for example, methyl bromide, ethyl bromide and propyl iodide; benzyl halides, such as benzyl chloride; and dilower alkyl sulfates, such as dimethyl sulfate. To form the quaternary ammonium salts, the free base initially formed is interacted with at least one equivalent of the desired alkylating agent in a suitable solvent, e.g., acetone, benzyl alcohol, dioxane, or cyclohexanone.

Examples of compounds falling within the present invention include, but are not limited to, the following wherein the symbol A represents —O—, —S—, —SO— and —SO₂—; each formula therefore, in essence, representing four species.

1. 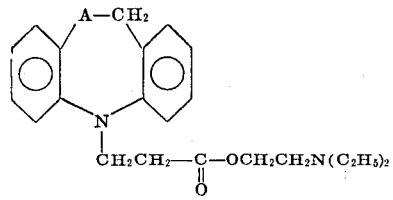

2. 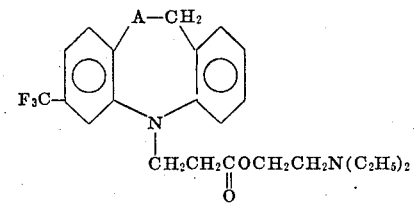

3. 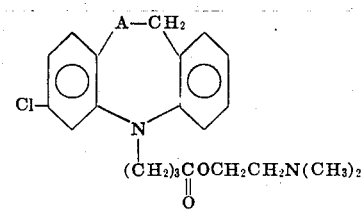

4. 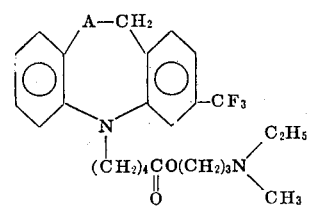

5. 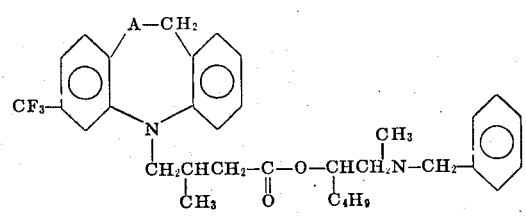

6. 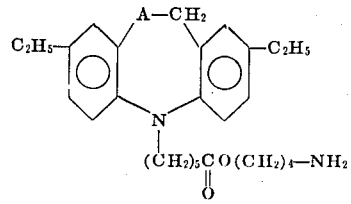

7. 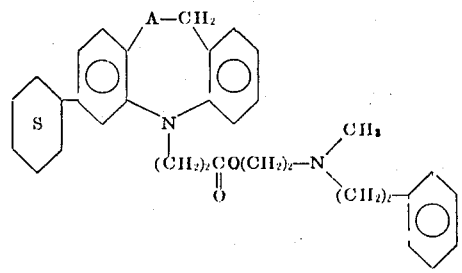

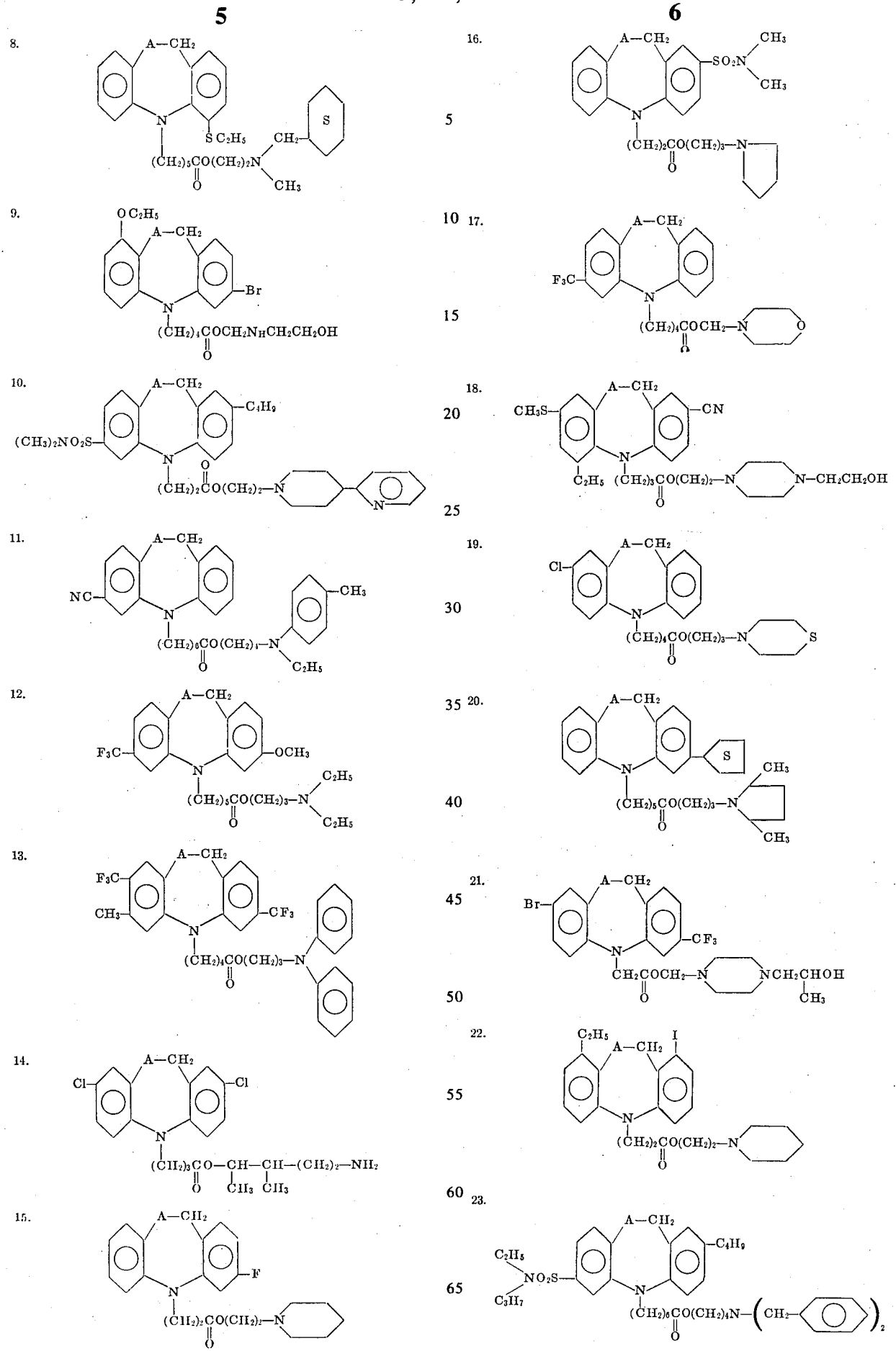

The compounds of Formula I can be prepared by reacting a compound of the structure

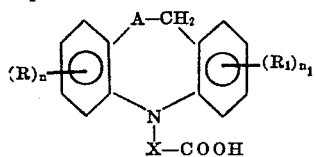

wherein R, R₁, X, n, n₁ and A are as defined hereinbefore, with a phosphorus pentahalide, such as phosphorus penta-chloride, in a molar ratio of II:pentahalide of within the range of from about 0.9:1 to about 1:1, in the absence of oxygen, and in the presence of an inert solvent, such as benzene, toluene, xylene, pentane, hexane, etc., at a temperature within the range of from about 0° to about 10° C, to form an acyl halide of the structure

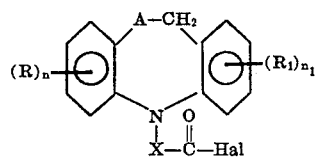

The acyl halide III is reacted with an amino alcohol of the structure

in a molar ratio of acyl halide III:amino alcohol IV within the range of from about 1:1 to about 1:2, using a solvent such as chloroform, benzene, toluene or xylene at a temperature within the range of from about 20° to about 130° C to form the Formula I compounds.

This process can also be carried out employing a mixture of a tertiary amine and the amino alcohol in a molar ratio of amino alcohol to amine of within the range of from about 0.5:1 to about 1:1, in lieu of the amino alcohol alone.

Compounds of structure I wherein A is SO can be prepared as follows: Compounds of the structure II wherein A is S are treated with an oxidizing agent like H₂O₂ in an alcohol solvent or perbenzoic acid or m-chloroperbenzoic acid in a solvent like chloroform to give a sulfoxide of the structure V.

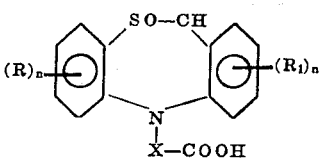

Compound V can then be reacted with the phosphorus pentahalide to give the corresponding acid chloride and then reacted with amino alcohol as described hereinbefore to form the compounds of Formula I.

Compounds of Formula I wherein A is SO₂ can be formed by treating Compound II or sulfoxide V with an oxidizing agent like H₂O₂ in formic or acetic acid to give sulfones of the structure VI

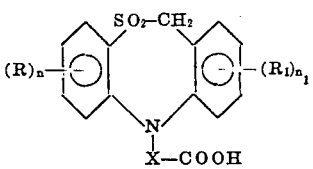

The starting materials of Formula II are prepared by several methods. One method comprises reacting compounds having the Formula VII

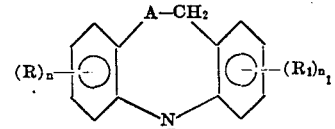

with a nitrile of Formula VII A (e.g., acrylonitrile, 2-methyl-acrylonitrile, 2-isopropylacrylonitrile, and so forth):

wherein R₄ is H or a lower alkyl group (e.g., straight or branched chain from about one to six carbons) yields compounds of Formula VIII:

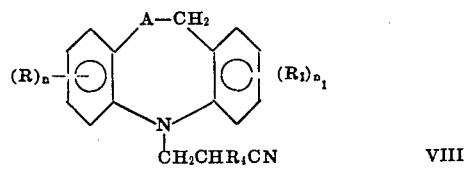

wherein $n$, $n_1$, R, R₁, A, and R₄ are as defined herein.

This reaction is carried out by employing an excess of the nitrile CH₂:CR₄CN as the solvent. The temperature utilized in the reaction can be varied from about 0° C to about 100° C. with the preferred range being between about 0° C. to about 55° C. This reaction proceeds expeditiously when a small amount (up to about 1 percent) of a strong base like sodium hydroxide, sodium methoxide, potassium t-butoxide, or benzyl trimethylammonium hydroxide (Triton B) is used.

Compounds with the nitrile structure VIII are converted to carboxylic acid of Formula II by heating at reflux temperatures with sufficient aqueous or alcoholic alkali metal hydroxide, e.g., sodium hydroxide or potassium hydroxide in methanol or ethanol.

Another procedure for preparing compounds of Formula I is to treat the compounds of structure VIII with alcoholic hydrogen halide, such as hydrogen chloride in methanol, ethanol, and so forth, at room temperature whereby esters of the structure IX are formed,

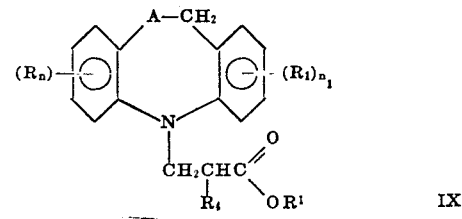

wherein R¹ is lower alkyl.

By saponifying compound IX with an equivalent of alkali metal hydroxide, e.g., sodium hydroxide, lithium hydroxide, and so forth, the desired carboxylic acids of structure II can be recovered.

Alternatively, a general procedure for preparing the compounds of structure II which may be utilized is to react the compounds having Formula VII with a haloalkylenecyanide of the general structure IX A

wherein Z is halogen, e.g., chloro, iodo or bromo; and X is as defined herein. This yields a nitrile of Formula VIII. Examples of haloalkylenecyanide reagents that may be utilized are 3-chloropropionitrile, 4-bromobutyronitrile, and so forth. The reaction may be carried out in an alcohol, such as ethanol, propanol, and so forth, as the solvent, in the presence of at least one molar equivalent of anhydrous potassium carbonate, or in an aromatic solvent like benzene, toluene, or xylene, using at least one molar equivalent of alkali metal hydride, e.g., sodium hydride, lithium hydride, and so forth, or alkali metal amine, e.g., sodium amide or in an aliphatic ketone like acetone or ethyl methyl ketone using at least one molar equivalent of powdered alkali metal hydroxide, e.g., sodium hydroxide of lithium hydroxide. The desired temperature in these reactions is between 60° and 150° C. The compounds of Formula VIII prepared by these reactions may be thereafter treated as indicated above to yield compounds of Formula I.

Examples of compounds of Formula VII where A is S are set out in U.S. Pat. Nos. 3,188,321 and 3,188,322.

Examples of compounds of Formula II where A is O or S can be found in U.S. Pat. Nos. 3,069,432, and 3,452,046 and in a paper entitled "Novel Polycyclic Heterocycles," by Yale et al., J. Med. Chem. 13, 713 (1970).

Examples of compounds of Formula VII wherein A is SO or SO₂ can be found in the above mentioned paper by Yale et al.

Furthermore, compounds of Formula VII wherein A is SO can be formed by heating a compound of the structure

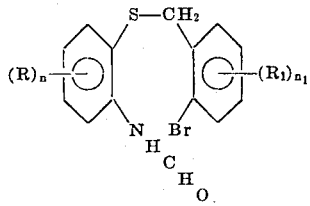

X in the presence of potassium carbonate, Cu Bronze, and a suitable solvent to form compounds of the structure

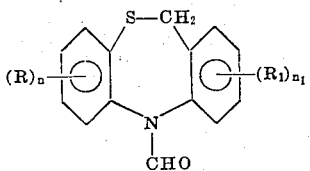

XI and treating compound XI with m-chloroperbenzoic acid in the presence of chloroform to form a compound of the structure XII

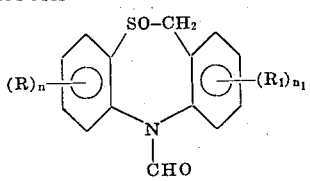

XII which can be treated with alcohol such as ethanol and base such as aqueous sodium hydroxide to form a compound of the structure

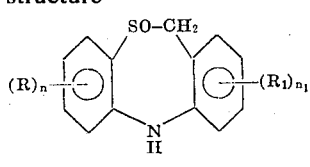

XIII

Compounds of Formula VII wherein A is SO₂ can be formed by treating compounds of the structure XI with an oxidizing agent such as hydrogen peroxide in the presence of formic acid to form a compound of the structure

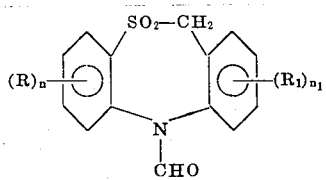

XIV and treating XIV with alcohol such as ethanol and base such as aqueous sodium hydroxide to form a compound of the structure

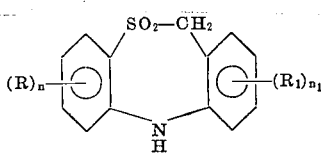

XV

Examples of starting materials which can be employed in preparing the compounds of the invention include, but are not limited to, the following wherein A can be O, S, SO or SO₂.

1.
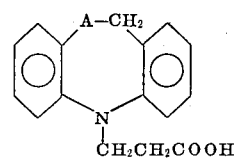

2.
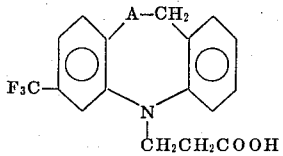

3.
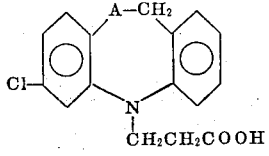

4.
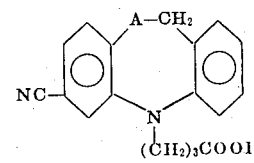

5.
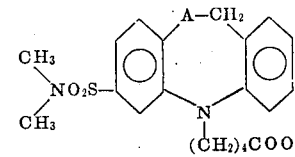

6.
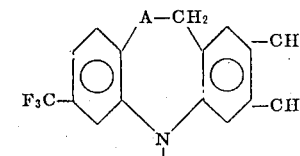

7. 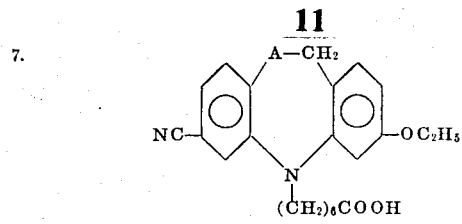
8. 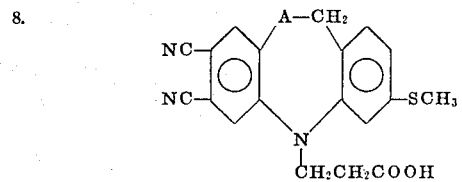
9. 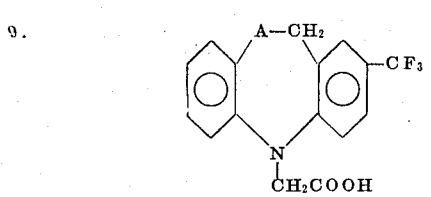
10. 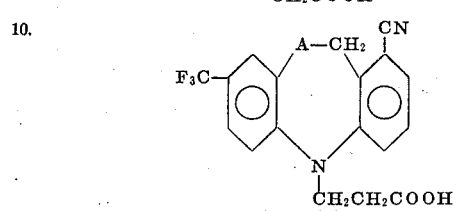
11. 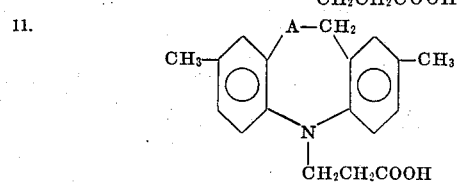
12. 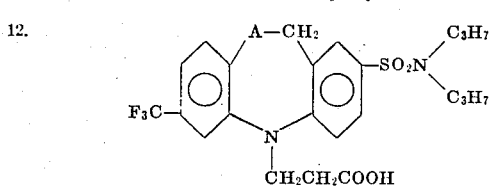
13. 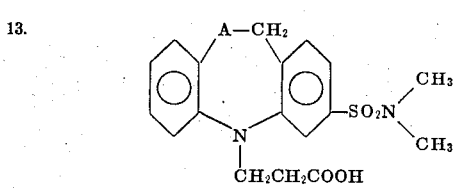
14. 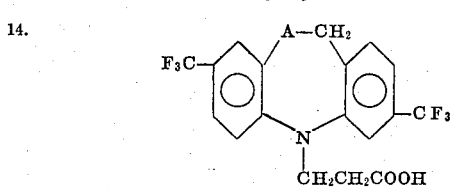
15. 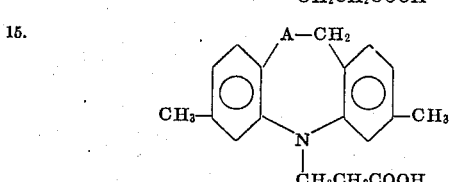
16. 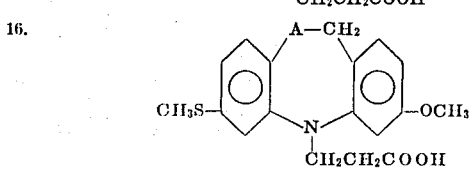

17. 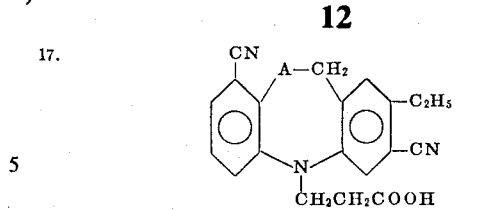
18. 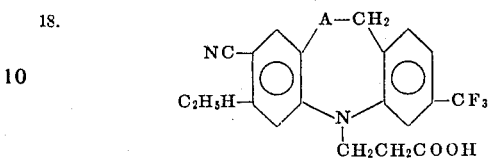
19. 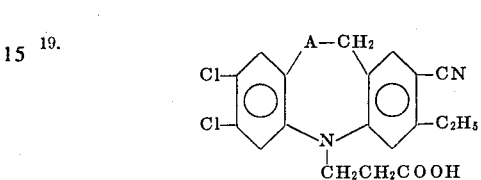
20. 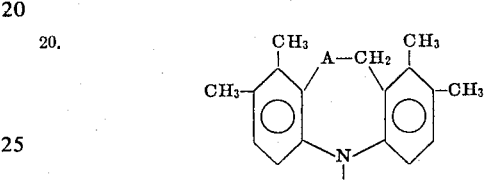
21. 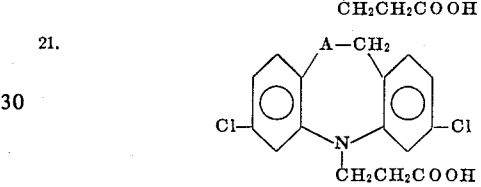
22. 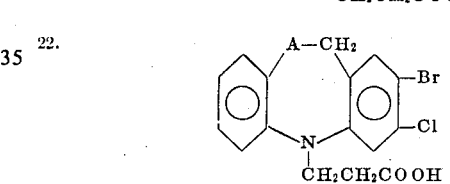
23. 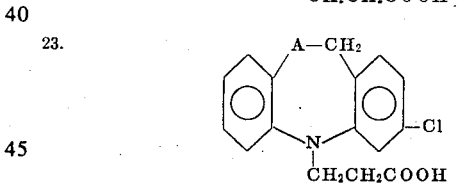

The compounds of the invention produce hypotension beginning a few minutes after dosing and yielding a moderate hypotension, i.e., a fall in blood pressure of about 20 percent or greater lasting about 5 hours after dosing.

The hypotensive agents of the invention or a physiologically acceptable salt thereof may be compounded according to accepted pharmaceutical practice in oral dosage forms such as tablets, capsules, elixirs or powders or parenterally in an injectable form in a sterile vehicle prepared according to conventional pharmaceutical practice. The dosage level may vary from about 1 mg/kg to about 50 mg/kg.

Liquid oral dosage forms may be prepared by dissolving the hypotensive agent in a suitable solvent, e.g., propylene glycol. Oral tablets may be prepared by incorporating the hypotensive agent into suitable pharmaceutical carriers. Injectable forms may be prepared by incorporating the hypotensive agent in a sterile vehicle, e.g., propylene glycol, according to conventional practice.

In addition, the new compounds of this invention have anti-inflammatory properties and are useful as anti-inflammatory agents, for example, to reduce local inflammatory conditions such as those of an edematous nature or resulting from proliferation of connective tissue in various mammalian species such as rats, dogs and the like when given orally in dosages of about 5 to 50 mg/kg/day, preferably 5 to 25 mg/kg/day, in single or 2 to 4 divided doses, as indicated by the carrageen edema assay in rats. The active substance may be utilized in compositions such as tablets, capsules, solutions or suspensions containing up to about 300 mg. per unit of dosage of a compound or mixture of compounds of Formula I or physiologically acceptable acid addition salt thereof. They may be compounded in a conventional manner with a physiologically acceptable vehicle or carrier, excipient, binder, preservative, stabilizer, flavor, etc., as called for by accepted pharmaceutical practice. Topical preparations containing about 0.01 to 3 percent by weight of active substance in a lotion, salve or cream may also be used.

The inventive compounds of the invention may also be used as surface disinfectants. About 0.01 to 1 percent by weight of any of these substances may be dispersed on an inert solid or in a liquid such as water and applied as a dust or spray. They may be incorporated also, for example, in a soap or other cleaning agent, e.g., a solid or liquid detergent, detergent composition, for example, in general cleaning, in cleaning dairy barns or equipment or cleaning food handling or processing equipment.

Furthermore, the inventive compounds of the invention may be used as water-softeners and corrosion inhibitors.

The following examples are illustrative of the invention and constitute preferred embodiments. Other members of the class are produced by utilizing the appropriately substituted starting material.

EXAMPLE 1

5,11-Dihydro-7-(trifluoromethyl)dibenz[b,e][1,4]-oxazepine-5-propionic acid, 2-(diethylamino)ethyl ester, oxalate I. 5,11-Dihydro-7-(trifluoromethyl)dibenz[b,e][1,4]-oxazepine-5-propionitrile.

a. To 50.0 g of 5,11-dihydro-7-(trifluoromethyl)dibenz-[b,e][1,4]oxazepine in 60 ml of redistilled acrylonitrile is added in 5 minutes .080 ml of Triton B. Subsequently, the mixture is heated for 1 hour under reflux and the product isolated by extraction with benzene to give 5,11-dihydro-7-(trifluoromethyl)dibenz[b,e][1,4]oxazepine-5-propionitrile, mp about 161°–163°.

b. 5,11-Dihydro-7-(trifluoromethyl)dibenz[b,e][1,4]-oxazepine-5-propionic acid, methyl ester.

5,11-Dihydro-7-(trifluoromethyl)dibenz[b,e][1,4]-oxazepine-5-propionitrile, 15.0 g. is dissolved in 240 ml of dry dioxane and to this 140 ml of 30 percent methanolic hydrogen chloride is added. The solution is stirred for 36 hours, 6 ml of H$_2$O is added, stirred 0.5 hour, and then concentrated in vacuo to 120 ml. The solid is filtered, and the filtrate is concentrated to dryness in vacuo. The residual liquid is taken up in 200 ml of diethyl ether, treated with Darco and Hyflo, the diethyl ether solution is concentrated and the residue distilled in vacuo to give 5,11-dihydro-7-(trifluoromethyl)dibenz[b,e][1,4]oxazepine-5-propionic acid, methyl ester, b.p. about 166°–168° (0.08 mm.), mp about 70.0°–71.5°.

c. 5,11-Dihydro-7-(trifluoromethyl)dibenz[b,e][1,4]-oxazepine-5-propionic acid.

5,11-Dihydro-7-(trifluoromethyl)dibenz[b,e][1,4]-oxazepine-5-propionic acid, methyl ester, 3.15 g, is dissolved in 315 ml of methanol and to this 0.5 g of potassium hydroxide dissolved in 25 ml of water is added. The mixture is refluxed for 2.5 hours and then concentrated in vacuo. The residue is taken up in 250 ml of water and this solution is acidified with 2 percent aqueous HCl to give 5,11-dihydro-7-(trifluoromethyl)-dibenz[b,e][1,4]oxazepine-5-propionic acid, mp about 107–109.

II. 5,11-Dihydro-7-(trifluoromethyl)dibenz[b,e][1,4]-oxazepine-5-propionyl chloride.

A suspension of 13.72 g (0.04 mole) of 5,11-dihydro-7-(trifluoromerhyl)dibenz[b,e][1,4]oxazepine-5-propionic acid in 225 ml of benzene is cooled to 5° and to this is added with stirring a solution of 10.0 g (0.048 mole) of phosphorus pentachloride in 80 ml of benzene over a period of 1 hour. This gives a yellow colored solution, which is stirred for 2.5 hours at 30°. To this 6.5 g of sodium hydrosulphite is added and stirred for 20 minutes. The reaction mixture is filtered, and then concentrated in vacuo, at bath temperature 40°–45. This gives 15.2 g of an orange yellow residue, which is warmed with 120 ml of petroleum ether (bp 30°–60), allowed to cool to room temperature and the solution decanted. The resulting petroleum ether solution, after keeping overnight in the cold room, deposits 12.2 g white shining crystalline 5,11-dihydro- 7-(trifluoromethyl)dibenz[b,e][1,4]oxazepine-5-propionyl chloride, m.p. 74°–76°, which is recrystallized from petroleum ether; mp about 76°–77°.

III. 5,11-Dihydro-7-(trifluoromethyl)dibenz[b,e][1,4]-oxazepine-5-propionic acid, 2-(diethylamino)ethyl ester.

To a solution of 3.2 g (0.009 mole) of the above acid chloride in 30 ml of chloroform is added dropwise a solution of 1.07 g (0.009 mole) of diethylaminoethanol in 10 ml of chloroform, and the reaction mixture is refluxed for 3 hours, on a steam bath. Next, the solvent is removed in vacuo, and to the residue 40 ml of water is added. The resulting turbid solution is made alkaline with 2 percent sodium hydroxide solution and the liberated base is extracted into 300 ml of ether. The ether solution is dried (MgSO$_4$), and the solvent removed in vacuo. The liquid residue is dissolved in 40 ml of acetonitrile, and to this is added a solution of 1.0 g of oxalic acid in 15 ml of acetonitrile. To this clear solution anhydrous ether is added until it becomes slightly turbid. This on keeping overnight in the cold room deposits 2.0 g of white shining crystalline oxalate derivative, mp 118°–120°. It is recrystallized from a mixture of 2-propanol and anhydrous ether, mp about 119°–121°.

EXAMPLE 2

7-Chloro-5,11-dihydrodibenz[b,e][1,4]oxazepine-5-propionic acid, [N$^4$-methyl-1-piperazinyl]ethyl ester, dimaleate I. 7-Chloro-5,11-dihydrodibenz[b,e][1,4]oxazepine-5-propionic acid a.   7-Chloro-5,11-dihydrodibenz[b,e][1,4]oxazepine-5-propionitrile.

A suspension of 17.4 g of 7-chloro-5,11-dihydrodibenz-[b,e][1,4]oxazepine in 35 ml of acrylonitrile is cooled to 0°–5°. To this is added with efficient stirring and cooling 0.2 ml of Triton B. The suspension becomes homogeneous and a red solution results with the rise of temperature to 10°. The reaction mixture is allowed to come to room temperature and then refluxed for one hour with stirring. The excess of acrylonitrile is removed by known means, water is added, and the solid is filtered. The solid is dried, powdered, and extracted with five 400 ml portions of diethyl ether. The diethyl ether extracts are dried and concentrated to a volume of 250 ml. The white crystalline compound is filtered. The filtrate is again concentrated and the resulting solid is filtered. The yield of the combined desired product is 21.5 g, mp about 131°–132°.

b.   7-Chloro-5,11-dihydrodibenz[b,e][1,4]oxazepine-5-propionic acid, methyl ester.

The product from (a), 7-chloro-5,11-dihydrodibenz[b,e]-[1,4]oxazepine-5-propionitrile, 71.10 g, is dissolved in 1,200 ml of dry dioxane and to this 800 ml of 30 percent methanolic hydrogen chloride is added. The solution is stirred for 72 hours, 30 ml of $H_2O$ is added, the mixture is stirred for 0.5 hour, concentrated in vacuo to 400 ml, filtered, and the filtrate concentrated to dryness in vacuo. The residue solidifies on keeping to yield the product 67.5 g, mp about 70°–72°.

c.   7-Chloro-5,11-dihydrodibenz[b,e][1,4]oxazepine-5-propionic acid.

The product from (b), 7-chloro-5,11-dihydrodibenz[b,e]-[1,4]oxazepine-5-propionic acid, methyl ester, 25.4 g, is dissolved in 2,200 ml of MeOH and to this 5.6 g of KOH dissolved in 300 ml of $H_2O$ is added. The solution is refluxed for 4 hours, and then is concentrated in vacuo. The residue is taken up in 600 ml of $H_2O$, the solution is cooled, and then acidified with 2 percent aqueous HCl. The solid is filtered and dissolved in 600 ml of $C_6H_6$. This solution is treated with Darco and then extracted with 600 ml of 2 percent aqueous NaOH solution. The extracts are treated with Darco and Hyflo, filtered and the filtrate is acidified with 2 percent aqueous HCl. The solid is filtered and recrystallized from $C_6H_6$. The yield is 23.0 g, mp about 155.0°–156.5°.

II.   7-Chloro-5,11-dihydrodibenz[b,e][1,4]oxazepine-5-propionic acid, 2-[$N^4$-methyl-$N^1$-piperazinyl]ethyl ester, dimaleate.

To 16.6 g of 7-chloro-5,11-dihydrodibenz[b,e][1,4]oxazepine-5-propionic acid in 325 ml of benzene at 5°, is added 12.5 g of phosphorus pentachloride in 90 ml of benzene. The reaction mixture is stirred for 1 hour at 30°; 6.3 g of sodium hydrosulfite is added, and the whole filtered. The filtrate is concentrated in vacuo; the residue is dissolved in 600 ml of refluxing petroleum ether, treated with Darco, filtered, and cooled to give 17.6 g of crystalline acid chloride mp 71°–72°. This is dissolved in 150 ml of chloroform and the solution is added dropwise to 6.6 g of N-methyl piperazine and 6.6 g of trimethylamine in 50 ml of chloroform. The reaction mixture is heated under reflux for 7 hours, cooled, washed, dried and concentrated in vacuo. The residual base is dissolved in 30 ml of 2-propanol and to this is added 7.0 g of maleic acid in 30 ml of 2-propanol. This on cooling gives 16.3 g of a white solid, mp about 168°–171° after recrystallization from acetonitrile.

EXAMPLES 3 to 16

Employing the procedure of Example 1, part II, including the phosphorus pentachloride, but substituting the acid starting materials (prepared employing the procedure of Example 1, part I) shown in column 1 and the amine starting material of column 2 of Table I below, the product shown in column 3 is obtained.

TABLE I

| Example No. | Column 1 | | | | | | | Column 2 ($N-R_2/R_3$) | Column 3 | |
|---|---|---|---|---|---|---|---|---|---|---|
| | A | R | $n$ | $R_1$ | $n_1$ | $n_2$ | Y | | | |
| 3 | O | 7-Cl | 1 | H | 0 | 2 | $-(CH_2)_2-$ | $N-(C_2H_5)_2$ | A R $n$ $R_1$ $n_1$ $n_2$ Y $R_2$ $R_3$ As in Column 1 | As in Column 2. |
| 4 | S | 7-$CF_3$ | 1 | H | 0 | 2 | $-(CH_2)_2-$ | piperidinyl | do | Do. |
| 5 | O | H | 0 | 3-Cl | 1 | 1 | $CH-CH_2-$ with $CH_3$ | 4-methylpiperazinyl ($N\!\!-\!\!N-CH_3$) | do | Do. |
| 6 | S | 7-Cl | 1 | 3-Cl | 1 | 2 | $(CH_2)_2$ | piperazinyl with $COOC_2H_5$ and phenyl substituent | do | Do. |
| 7 | S | 7-Cl | 1 | 3-Cl | 1 | 2 | $(CH_2)_2$ | $N\!\!-\!\!N-(CH_2)_2OH$ | do | Do. |
| 8 | S | 7-$CF_3$ | 1 | H | 0 | 2 | $(CH_2)_3$ | $N-(C_2H_5)_2$ | do | Do. |
| 9 | O | 7-$CF_3$ | 1 | 3-$CF_3$ | 1 | 4 | $(CH_2)_2$ | morpholinyl ($N\!\!-\!\!O$) | do | Do. |
| 10 | S | 7,8-di-Cl | 2 | H | 0 | 4 | $(CH_2)_3$ | thiomorpholinyl ($N\!\!-\!\!S$) | do | Do. |

TABLE I – Continued

| | Column 1 | | | | | Column 2 | Column 3 |
|---|---|---|---|---|---|---|---|
| 11 | O  H | 0 | 2,3-di-Cl | 2 | 5 (CH₂)₂ | [piperazine]–(CH₂)₃OH | ....do.... Do. |
| 12 | S  9-CN | 1 | 2-CH₃S | 1 | 3 (CH₂)₃ | N(CH₃)(pyrrolidine-CH₃) | ....do.... Do. |
| 13 | O  8-CH₃O | 1 | 1-CH₃O 3-CF₃ | 2 | 2 CH₃CH–CH₂– \| CH₃ | N–(CH₂–C₆H₅)₂ | ....do.... Do. |
| 14 | S  7-SO₂N-(CH₃)₂ | 1 | 3-C₃H₇ | 1 | 3 (CH₂)₂ | [piperazine-N-phenyl] | ....do.... Do. |
| 15 | O  6-C₄H₉ | 1 | 2,3-di-CH₃ | 2 | 2 CH₂ | [piperazine-N-(2-methoxyphenyl)] | ....do.... Do. |
| 16 | S  9-C₂H₅O | 1 | 3-Br | 1 | 3 (CH₂)₃ | [piperidine-N-C(=O)NH-phenyl] | ....do.... Do. |

EXAMPLE 17

7Chloro-5,11-dihydrodibenz[b,e][1,4]thiazepine-5-acetic acid, (diethylamino)ethyl ester, 10-oxide A. 7-Chloro-5,11-dihydrodibenz[b,e][1,4]thiazepine-5-acetic acid, 10 oxide.

To a suspension of 25.5 g of 7-chloro-5,11-dihydrodibenz-[b,e][1,4]thiazepine, 250 ml of ethyl methyl ketone, 0.5 g of copper-bronze, and 16.0 g of powdered sodium hydroxide is added dropwise in 0.5 hour 15.1 g of chloroacetonitrile. The mixture is stirred and refluxed for 10 hours, cooled and filtered. The filtrate is concentrated in vacuo to remove all volatile material, and the residue is dissolved in 25 ml of methanol to give 7-chloro-5,11-dihydrodibenz[b,e][1,4]-thiazepine-5-acetonitrile.

The 7-chloro-5,11-dihydrodibenz[b,e][1,4]thiazepine-5-acetonitrile, 70.0 g, is dissolved in 1,200 ml of dry dioxane and to this 800 ml of 30 percent methanolic hydrogen chloride is added. The solution is stirred for 72 hours, 30 ml of H₂O is added, the mixture is stirred for 0.5 hour, concentrated in vacuo to 400 ml, filtered, and the filtrate concentrated to dryness in vacuo. The residue solidifies on keeping to yield 7-chloro-5,11-dihydrodibenz[b,e][1,4]thiazepine-5-acetic acid, methyl ester.

The 7-chloro-5,11-dihydrodibenz[b,e][1,4]thiazepine-5-acetic acid, methyl ester, 27.0 g is dissolved in 2,200 ml of methanol and to this 5.6 g of potassium hydroxide dissolved in 300 ml of H₂O is added. The solution is refluxed for 4 hours, and then is concentrated in vacuo. The residue is taken up in 600 ml of H₂O, the solution is cooled, and then acidified with 2 percent aqueous hydrogen chloride. The solid is filtered and dissolved in 600 ml of benzene. This solution is treated with Darco and then extracted with 600 ml of 2 percent aqueous sodium hydroxide solution. The extracts are treated with Darco and Hyflo, filtered and the filtrate is acidified with 2 percent aqueous HCl. The solid is filtered and recrystallized from benzene to yield 7-chloro-5,11-dihydrodibenz[b,e][1,4]-thiazepine-5-acetic acid.

To a solution of 9.1 g of 7-chloro-5,11-dihydro-5,11-dibenz[b,e][1,4]thiazepine-5-acetic acid in 500 ml of 95 percent ethanol is added 30 g of 31.9 percent hydrogen peroxide and the solution is heated under reflux for 10 hours. Concentration in vacuo gives 9.2 g of semisolid residue, which is crystallized from 400 ml of hot hexane, to give 7.4 g of 7-chloro-5,11-dihydrodibenz[b,e][1,4]thiazepine-5-acetic acid, 10-oxide.

B. 7-Chloro-5,11-dihydrodibenz[b,e][1,4]thiazepine-5-acetic acid, 2-(diethylamino)ethyl ester.

Following the procedure of Example 1, part III, but substituting 7-chloro-5,11-dihydrodibenz[b,e][1,4]thiazepine-5-acetic acid, 10-oxide for the 5,11-dihydro-7-(trifluoro-methyl)dibenz[b,e][1,4]oxazepine-5-propionic acid chloride, there is obtained the title compound.

EXAMPLES 18 to 23

Employing the procedure of Example 17 but substituting the acid starting material shown in Column 1 of Table II below in forming the oxide, which oxide converted to oxide-acyl chloride and the resulting oxide-acid chloride with the starting material shown in Column 2, the product shown in Column 3 is obtained.

TABLE II

| Column 1 | Column 2 | Column 3 |
|---|---|---|
| (R)ₙ–[benzene]–S–CH₂–[benzene]–(R₁)ₙ₁ with N–(CH₂)ₙ₂–C(=O)OH | HO–Y–N(R₂)(R₃) | (R)ₙ–[benzene]–SO–CH₂–[benzene]–(R₁)ₙ₁ with N–(CH₂)ₙ₂–C(=O)OY–N(R₂)(R₃) |

TABLE II – Continued

| Example No. | Column 1 | | | | | Column 2 | | Column 3 | |
|---|---|---|---|---|---|---|---|---|---|
| | R | n | $R_1$ | $n_1$ | $n_2$ | Y | N(R_2)(R_3) | R n $R_1$ $n_1$ $n_2$ | Y N $R_2$ $R_3$ |
| 18 | H | 0 | 3—Cl | 1 | 1 | $(CH_2)_3$ | $N—(C_3H_7)_2$ | As in Column 1 | As in Column 2. |
| 19 | 7—Cl | 1 | 3—Cl | 1 | 2 | $CH_2$ |  ($C_2H_5$, N-pyrrolidinyl) | do | Do. |
| 20 | 7—$CF_3$ | 1 | 3—$CF_3$ | 1 | 3 | $(CH_2)_2$ | 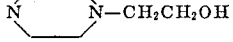 (N-piperazinyl-$CH_2CH_2OH$) | do | Do. |
| 21 | 6—$CH_3O$ | 1 | 2—CN | 1 | 4 | $(CH_2)_4$ | 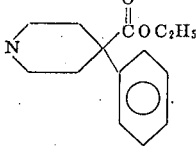 (4-phenyl-4-carbethoxy-piperidinyl) | do | Do. |
| 22 | H | 0 | 3—$SO_2N—(CH_3)_2$ | 1 | 5 | $(CH_2)_3$ |  (morpholino) | do | Do. |
| 23 | 7—$CF_3$ | 1 | H | 0 | 2 | $(CH_2)_2$ | 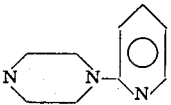 (4-(2-pyridyl)piperazinyl) | do | Do. |

EXAMPLE 24

5,11-Dihydro-7-(trifluoromethyl)dibenz[b,e][1,4]thiazepine-5-propionic acid, ($N^4$-methyl-$N^1$-piperazinyl)-ethyl maleate ester 10,10-dioxide A. 5,11-Dihydro-7-(trifluoromethyl)dibenz[b,e][1,4]-thiazepine-5-butyric acid, 10,10-dioxide.

To a suspension of 25.5 g of 5,11-dihydro-7-(trifluoromethyl)dibenz[b,e][1,4]thiazepine, 250 ml of ethyl methyl ketone, 0.5 g of copper-bronze, and 16.0 g of powdered sodium hydroxide is added dropwise in 0.5 hour 29.6 g of 4-bromo-butyronitrile. The mixture is stirred and refluxed for 10 hours, cooled, and filtered. The filtrate is concentrated in vacuo to remove all volatile material, and the residue is dissolved in 25 ml of methanol to give 5,11-dihydro-7-(trifluoromethyl)dibenz[b,e][1,4]thiazepine-5-butyronitrile.

The 5,11-dihydro-7-(trifluoromethyl)-dibenz-[b,e][1,4]thiazepine-5-butyronitrile, 73.0 g is dissolved in 1,200 ml of dry dioxane and to this 800 ml of 30 percent methanolic hydrogen chloride is added. The solution is stirred for 72 hours, 30 ml of $H_2O$ is added, the mixture is stirred for 0.5 hour, concentrated in vacuo to 400 ml, filtered, and the filtrate concentrated to dryness in vacuo. The residue solidifies on keeping to yield 5,11-dihydro-7(trifluoromethyl)-dibenz[b,e][1,4]thiazepine-5-butyric acid, methyl ester.

The 5,11-dihydro-7-(trifluoromethyl)dibenz[b,e][1,4]-thiazepine-5-butyric acid, methyl ester, 36.0 g is dissolved in 2,200 ml of methanol and to this 5.6 g of potassium hydroxide dissolved in 300 ml of $H_2O$ is added. The solution is refluxed for 4 hours, and then is concentrated in vacuo. The residue is taken up in 600 ml of $H_2O$, the solution is cooled, and then acidified with 2 percent aqueous hydrogen chloride. The solid is filtered and dissolved in 600 ml of benzene. This solution is treated with Darco and then extracted with 600 ml of 2 percent aqueous sodium hydroxide solution. The extracts are treated with Darco and Hyflo, filtered and the filtrate is acidified with 2 percent aqueous hydrogen chloride. The solid is filtered and recrystallized from benzene to yield 5,11-dihydro-7-(trifluoromethyl)dibenz[b,e][1,4]thiazepine-5-butyric acid 23.0 g, mp about 131°–132°.

To a solution of 8.1 g of 5,11-dihydro-7-(trifluoromethyl)dibenz[b,e][1,4]thiazepine-5-butyric acid in 40 ml of 98–100 percent formic acid, is added dropwise 14 ml of 30 percent hydrogen peroxide; this results in an exothermic reaction. The reaction mixture is heated at 70° for 3 hours, and concentrated in vacuo at 45°. This residue is dissolved in 300 ml of ether and the ether solution is extracted in 250 ml of 2 percent aqueous sodium hydroxide. The alkaline solution is cooled to 5° and made acidic with 10 percent aqueous hydrochloric acid; the white precipitate filtered and dried. This on crystallization in 350 ml of hot hexane gives 6.3 g of 5,11-dihydro-7-(trifluoromethyl)dibenz[b,e][1,4]thiazepine-5-butyric acid, 10,10-dioxide, mp about 115°–117°.

B. 5,11-Dihydro-7-(trifluoromethyl)dibenz[b,e][1,4]-thiazepine-5-butyric acid, 2[$N^4$-methyl)-$N^1$-piperazinyl] ethyl ester, 10,10-dioxide, dimaleate.

Following the procedure of Example 2, but substituting 5,11-dihydro-7-(trifluoromethyl)dibenz[b,e][1,4]thiazepine-5-butyric acid, 10,10-dioxide for the 7-chloro-5,11-dihydro-dibenz[b,e][1,4]oxazepine-5-propionic acid, the title compound is obtained, mp about 139°–141°.

EXAMPLES 25 to 30

Employing the procedure of Example 24, but substituting the acid starting material shown in Column 1 of Table III below in forming the dioxide and then reacting the dioxide with the starting material shown in Column 2, the product shown in Column 3 is obtained.

TABLE III

| | Column 1 | | | | | | Column 2 | Column 3 | |
|---|---|---|---|---|---|---|---|---|---|
| Example No. | R | n | R₁ | n₁ | n₂ | Y | $\begin{array}{c}R_2\\N\\R_3\end{array}$ | R n R₁ n₁ n₂ | $Y-N\begin{array}{c}R_2\\R_3\end{array}$ |
| 25 | 7-CF₃ | 1 | H | 0 | 1 | (CH₂)₂ | N(CH₃)(C₂H₅) | As in Column 1 | As in Column 2. |
| 26 | 6-CF₃ | 1 | 3-CF₃ | 1 | 2 | CH₂CH(CH₃)CH₂ | N(CH₃)(CH₂-C₆H₅) | do | Do. |
| 27 | 7,8-di-Cl | 2 | 3-Cl | 1 | 3 | (CH₂)₃ | piperazino-(CH₃)C₆H₄ | do | Do. |
| 28 | H | 0 | 3-CN | 1 | 4 | (CH₂)₄ | piperazino-pyridyl | do | Do. |
| 29 | 8-CN | 1 | 3-SO₂N-(CH₃)₂ | 1 | 5 | (CH₂)₂ | 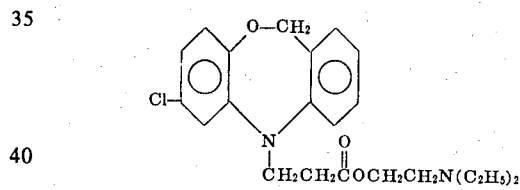 | do | Do. |
| 30 | 7-CH₃S— | 1 | 3-CH₃S— | 1 | 6 | (CH₂)₂ | N(piperazino)-CH₂CH₂OH | do | Do. |

What is claimed is:

1. A compound of the structure

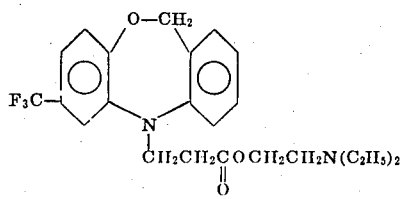

wherein R and R₁ are the same or different and are selected from the group consisting of halogen, trifluoromethyl, lower alkyl, lower cycloalkyl, lower alkylmercapto, lower alkoxy, cyano or di-lower alkylsulfamoyl; n and n₁ are independently 0, 1 or 2; A is O, S, SO or SO₂; X is an alkylene containing from one to six carbon atoms; Y is an alkylene radical containing from one to four carbon atoms R₂ and R₃ are the same or different and are selected from the group consisting of hydrogen and lower alkyl, or R₂ and R₃ taken together with the nitrogen to which they are attached form a heterocyclic radical selected from piperidino, pyrrolidino, morpholino, thiamorpholino and piperazino, or the acid salts thereof, quaternary salts thereof and N-oxides thereof.

2. A compound in accordance with claim 1 having the structure

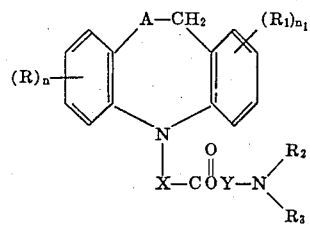

3. A compound in accordance with claim 1 having the structure

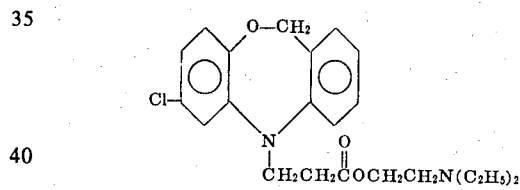

4. A compound in accordance with claim 1 having the structure

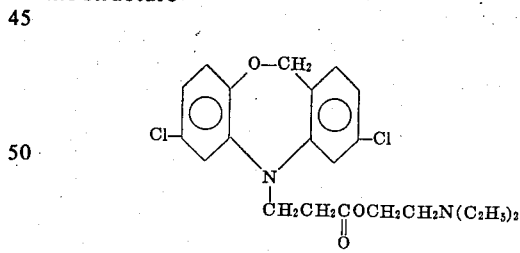

5. A compound in accordance with claim 1 having the structure

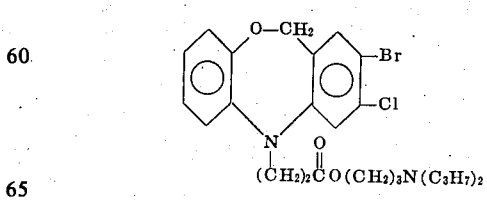

* * * * *